Dec. 6, 1927.
S. L. LEBBY
1,651,719
DECENTERED MIRROR
Filed Sept. 13, 1923
3 Sheets-Sheet 3
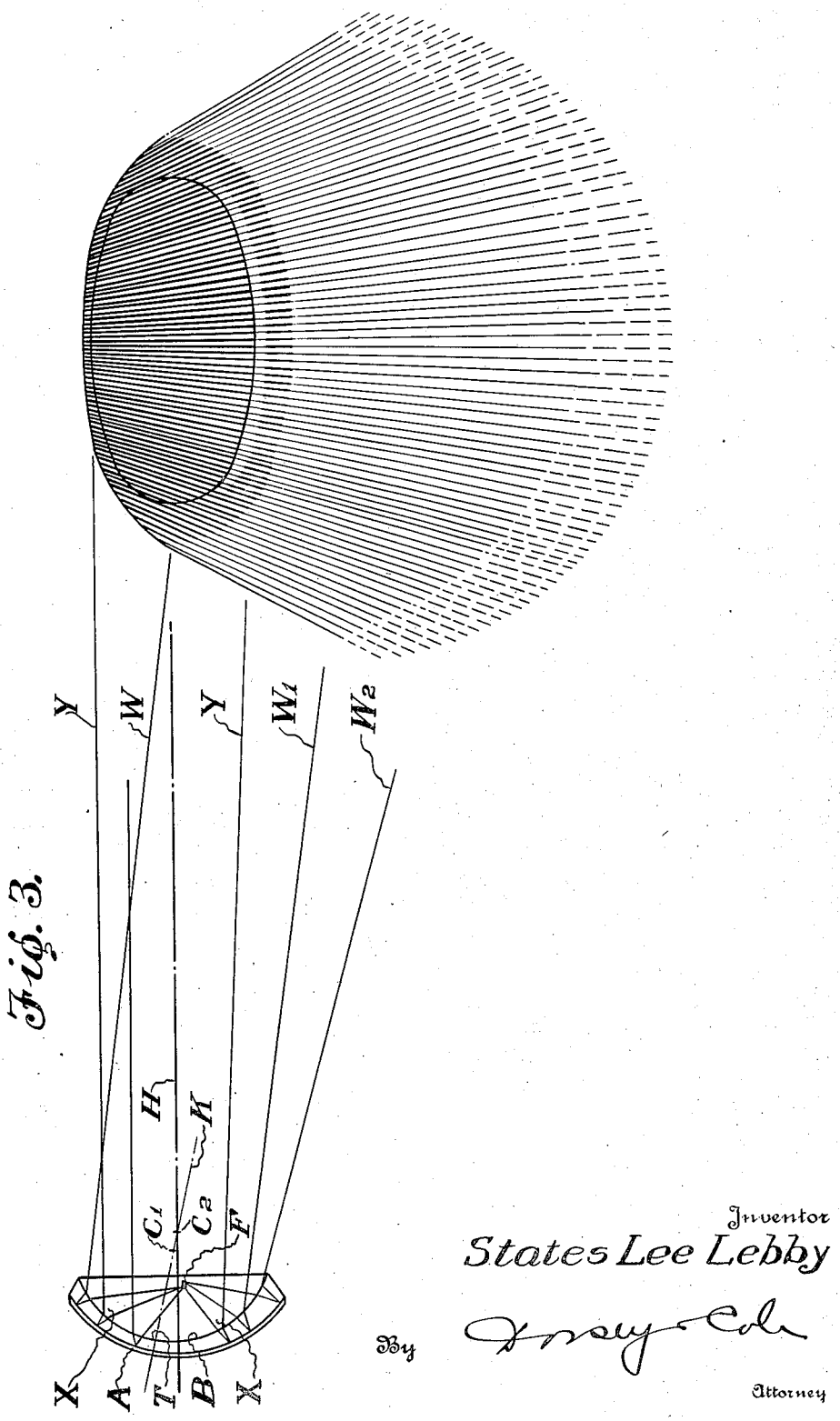
Inventor
States Lee Lebby Patented Dec. 6, 1927.

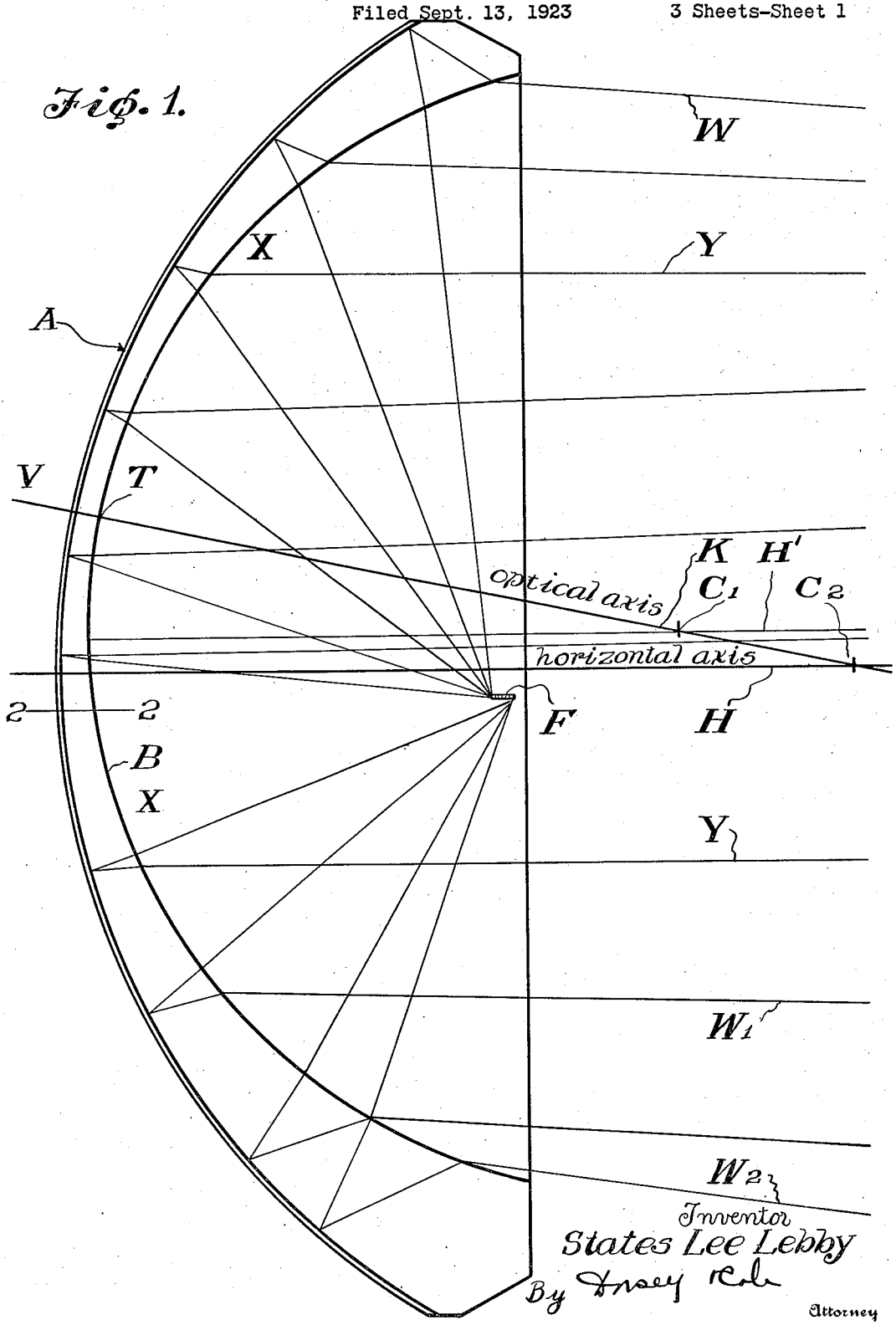

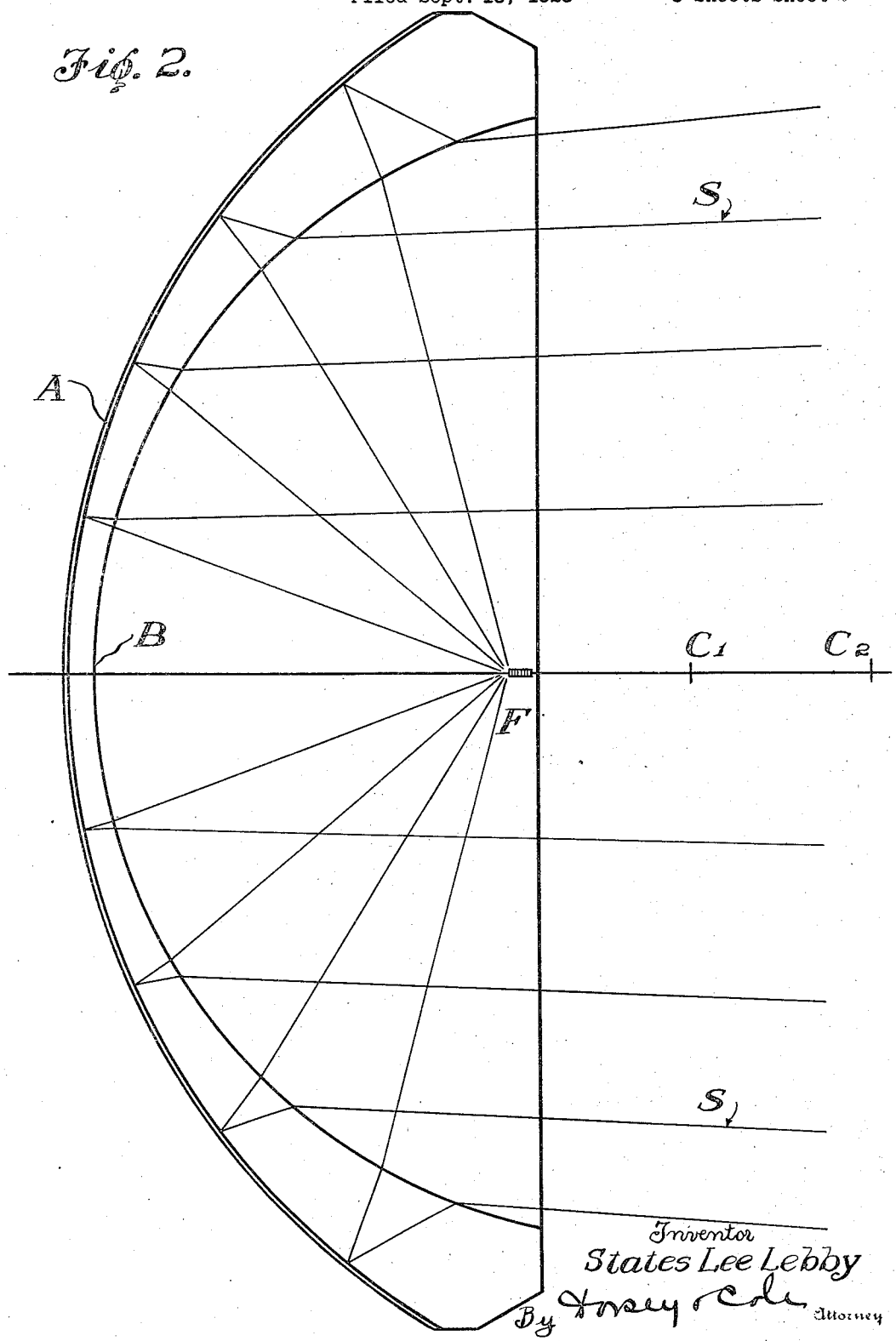

1,651,719

UNITED STATES PATENT OFFICE.

STATES LEE LEBBY, OF CORNING, NEW YORK.

DECENTERED MIRROR.

Application filed September 19, 1923. Serial No. 662,544.

This invention has for its object to provide a refracting mirror having spherical front and rear faces so formed with respect to each other that when a concentrated light source is placed at a focal point substantially below the optical axis of the mirror, rays of constant vertical angle with the optical axis will be projected by a considerable portion of the mirror, and rays having constantly decreasing angle therewith will be projected by the portion of the mirror outside of the intermediate portion as the point of projection moves from the vertex.

My invention provides a projection mirror having spherical front and rear faces so formed with respect to each other that, in a vertical plane, the mirror will have for a given focal point, an unsymmetrical spherical aberration, while in a horizontal plane, the mirror will have symmetrical spherical aberration.

A still further object of my invention is to provide a projection mirror having spherical front and rear faces so formed with respect to each other that the above mentioned results can be obtained by the usual well-known commercial methods now in general use in manufacturing projecting mirrors from pressed-glass blanks; i. e., the grinding and polishing of glass spherical surfaces by machinery.

With these and other objects in view, the invention includes the novel features of construction and arrangement and relation of the parts hereinafter described and particularly defined by the appended claims.

An embodiment of my invention is illustrated in the accompanying drawings, in which:—

Figure 1, is a vertical central section through a projection mirror constructed according to my invention, showing in vertical development, the projection of selected light rays from a properly located light source.

Figure 2 is a horizontal section taken on line 2—2 of Figure 1, illustrating in horizontal development the projection of the light rays from a source located in the same point as in Figure 1.

Figure 3 is a diagrammatic view (in vertical and cross section) illustrating the beam spot projected by the mirror, the section of the mirror shown being the same as that illustrated in Figure 1.

A mirror falling within the scope of my invention is particularly useful for use in cases where it is desired to project a beam of light in which there is a sharp cut-off along the upper edge of the beam, and in which the maximum itensity of light is projected adjacent to the upper portion of the beam while the light forming the remaining portion of the beam constantly decreases in intensity and increases in spread, as is particularly useful in automobile and locomotive headlights, as well as in railway signalling mirrors.

By this invention the high intensity and concentration of the light in the top portion of the beam is provided by the central portion of the mirror which project parallel rays, the remaining portion of the mirror projecting rays downwardly and divergently, forming a field of decreasing intensity. This is accomplished by striking the front face of the mirror as a spherical surface with such a relative radius to the radius of the spherical rear surface, and from a center displaced from the axis of the rear surface and at such a distance from the centre of the rear face that with a light source located at a selected focal point below the horizontal axis of the mirror, rays substantially parallel in vertical development, and divergent in horizontal development, will be projected by the portions of the mirror surrounding the vertex, such rays being at an angle to the optical axis of the mirror, and being projected upwardly in respect thereto.

As a quantitative example of a mirror embodying my invention, I state that the glass of which the mirror shown in the drawings is composed, has a refractive index of 1.52; that the silvered rear convex face A (see Figure 3) has a radius of curvature of 89 mm. struck as a sphere from the point $C^2$; that the spherical front face B is struck with a radius of curvature of 66.5 mm. from the point $C^1$, and at distance of 18.5 mm. from $C^2$; that the thickness of the mirror at the vertex T is 4 mm.; that the diameter of the mirror is 146 mm.; that the focal point is at F, (i. e. tip of the filament) which point is substantially 3.3 mm. below the horizontal axis of the mirror, and at a distance of 50 mm. from the rear face of the mirror at the horizontal axis thereof; that the light source is preferably in the form of a concentrated filament 2.5 mm. long; and that the mirror subtends an angle of the light source of about 180 degrees. With a construction having these constants, the axis of the projected beam as formed by the substantially parallel rays, forms an angle of approximately 12 degrees with the optical axis of the mirror.

The face edge of the mirror in vertical development is on a chord forming an angle with the optical axis, and substantially perpendicular to the beam or horizontal axis. With the optical axis inclined to the horizontal axis at an angle having its apex at $C^2$, it will be apparent that the front face of the mirror will be displaced upwardly with respect to the rear convex face A.

This decentering of the front spherical face of the mirror with respect to the rear spherical face can readily be accomplished. When the mirror is being formed from molten glass, by forming the opening in the ring through which the press plunger passes eccentric to the mold bottom, so that when a spherically faced plunger is pressed into the glass in a mold bottom having a spherical concaved surface, the article so formed will have eccentrically disposed front and rear faces, such as is shown by Figure 1 of the drawings. As these faces will be spherical, it will be understood that they can be finished in the manner heretofore employed in finishing spherical mirrors. It will also be understood that the rear convex face A of the mirror thus forms a surface of revolution about the horizontal axis indicated, and that the front concave surface B forms a surface of revolution about an axis H' intersecting and normal to the chord, and parallel with and displaced from the horizontal axis.

With the construction shown, when the mirror is set-up with the optical axis inclined to the horizontal, rays from the light source falling on the mirror within a certain zone marked X—X around the vertex T, will be projected substantially parallel in vertical development, as shown by the rays Y, Figure 1; and at an angle to the optical axis. Rays from the light source falling on parts of the mirror exterior to such zone are projected downwardly, as shown by rays W, $W^1$, $W^2$, Figure 1.

It will be noticed that rays W, projected from the upper portion of the exterior zone of the mirror (Figure 1) are projected downwardly at such angle that they pass through the parallel rays Y, and contribute to the illumination of the lower portion of the beam.

On the other hand, the rays $W^1$, $W^2$, projected from the lower portion of the mirror exterior of the zone X—X, are projected downwardly at progressively increasing angles, as shown, and it is these rays which form the lower portion of the beam.

Referring now to Figure 2 wherein is shown a horizontal section of the mirror, rays from the light source falling on this section of the mirror will be projected in the form of a laterally diverging beam, as shown by rays S.

The above described features of the invention will be more readily understood by referring to Figure 3, wherein the beam spot illustrated is a true reproduction from an actual beam projected by a mirror constructed according to the quantative example given above.

It will be further noted that the position of the light source as shown in Figure 1 determines the direction of the axis of the main beam, and at the same time modifies vertical spread due to the aberration of the mirror, so that the spread is reduced at upper portions of the mirror and increased at lower portions thereof. This necessitates, that for good results, the mirror have proper aberration values at its marginal portions. Generally with a mirror of this type, a movement of the light source in respect to the horizontal axis (say upwardly Figure 1) causes a reverse movement of the parallel beam (say down in Figure 1).

To obtain a maximum concentration of the main beam it is desirable that the mirror have the ratio of inner to outer curvature of 1.-to 1.338 found in the specific mirror here shown. It will be noted that depth of mirror, and the resultant aberration is of great importance in giving the desired lateral spread.

A particularly useful feature of this invention is that the distance of the point F from the mirror vertex must be accurately located to obtain the results described. This point, however, is easily ascertained with great accuracy by an ordinary user by trial methods, for unless the light be properly located to produce the described cut off, the intensity of the main beam is so reduced that for practical purposes, it is destroyed and incapable of producing either a glaring or efficient driving light. Hence any adjustment which will meet the requirements of the user will give the cut-off which will prevent glare in the eyes of one approaching.

By this invention I am enabled while using only spherical surfaces to accomplish the desired results described above, which results it has heretofore been attempted to obtain by using faces of variant and toroidal curvatures, all of which are difficult to form.

Having thus described my invention what I claim is:—

1. A catadioptric light projecting mirror having a rear and a front surface, both of which are spherical, and both of which modify the direction of the same light rays, the axis of revolution of one of which surfaces is transversely off-set with respect to the axis of revolution of the other.

2. A catadioptric light projecting mirror having a rear and a front surface, both of which are spherical and both of which modify the direction of the same light rays, whose axes of revolution are transversely off-set with respect to each other, the ratio of curvature of the front to the rear surface being substantially as 1 is to 1.33.

3. A catadioptric light projecting mirror having a rear and a front surface, both of which are spherical and both of which modify the direction of the same light rays, the axis of revolution of one of which is off-set vertically with respect to the axis of revolution of the other, in conjunction with a light source located below the line joining the centers of curvature of the faces.

In testimony whereof I hereunto sign my name.

STATES LEE LEBBY.